3,341,327
PHOTOCERAMIC PROCESS FOR PRODUCING VITRIFIED PHOTOGRAPHIC IMAGES
Francis J. Avery, Vestal, N.Y., assignor to General Aniline & Film Corporation, New York, N.Y., a corporation of Delaware
No Drawing. Filed Apr. 30, 1964, Ser. No. 363,989
9 Claims. (Cl. 96—34)

The present invention relates to vitrified photographic images on ceramic ware and, in particular, to a method for recording and processing a permanent colored, photographic image in a ceramic glaze.

Many photographic techniques have been developed in the ceramic arts for forming half-tone images that could be converted to ceramic pigments and transferred, either directly or indirectly, to ceramic objects. Silk screens which can be formed photographically have enjoyed great popularity as a means for printing line work directly on ceramic tiles and the like, while using ceramic pigments in vehicles which can be fired to produce vitrified images.

Silk screens also are most important in producing decalcomanias which have been used so effectively for gold, platinum and palladium overglaze decorations. These types of decorations are limited to photographic line and half-tone images. It is most difficult to produce images of even 64 line screens.

The prior art has indicated that to form a continuous tone image, it has been necessary to use collodion silver halide emulsions from which a silver image can be converted to a gold, platinum, or palladium image.

In this process the collodion and the image must be transferred to the ceramic base, fired and then reglazed and refired. A great deal of skill is necessary to produce such photographic images and to transfer them successfully to ceramic ware. The materials are costly and the methods not only limit the operator to collodion-silver halide emulsions which are of a very low speed, but also necessitate a most difficult transfer process and then require reglazing and refiring.

The application of a gelatino-silver halide emulsion to ceramic objects such as china plates, ashtrays, or the like, is within the contemplation of the prior art. The use of such an emulsion will produce by conventional exposure and development a silver image on the ceramic object. It is known, however, that when such a silver image is fired at say a temperature of 1400° F., it results only in a dirty, brownish stain which is nearly indistinguishable.

Generally speaking, in order to form a good vitrified image that can be permanentized by firing, the following conditions must be fulfilled:

(1) There must be present during processing a ceramic pigment which normally consists of metal oxides, metal silicates or metal aluminates. These metal compounds are the means of forming a color which is not destroyed at high temperatures.

(2) There also must be present a flux which lowers the refractory nature of the metal compounds so that they may combine with the silicate base on which the image is formed. At temperatures below 2000° F., lead oxides and borates are the most useful fluxes used in ceramics.

I have now discovered that these prerequisites may be realized by applying a gelatino-silver halide emulsion to a ceramic object, exposing and converting the resultant latent image to a silver image by conventional processing, toning by use of the silver image to form imagewise a mixture of lead ferrocyanide and an insoluble ferrocyanide of another heavy base metal and firing the mixture to provide both the required ceramic pigment and the flux. Such toning procedure constitutes the purposes and object of the present invention.

The gelatino-silver halide emulsion which I employ is one which will have a speed of approximately photographic enlarging paper and is usually a silver chlorobromoiodide or a silver bromo-iodide emulsion of the ammonia type. However, any gelatino-silver halide emulsion having the indicated speed is acceptable.

The emulsion may be applied to the ceramic ware by whirling, brushing, spraying, dipping or transfer from a strip film. The emulsion after application is dried and is then ready for processing.

An image is projected onto the light-sensitive surface, for instance by means of a photo-enlarger, at an exposure time of $f16$ for 10 to 40 seconds. It might be noted that this exposure is in marked contrast to those given to collodion-silver halide emulsions (arc-light exposure) because of their slower speeds.

The exposed emulsion is then developed in a conventional black-and-white developer such as a metol-hydroquinone developer, washed and fixed in hypo. After washing and drying, the continuous tone silver image obtained is ready for toning.

To this end it is treated with an oxidizing agent such as a water-soluble ferricyanide, a lead salt, and a water-soluble salt of a heavy base metal to produce imagewise a mixture of lead ferrocyanide and a water-insoluble heavy base metal ferrocyanide. The processing may be carried out by two-solution toning or by single-solution toning. In two-solution toning, the silver image is converted to silver ferrocyanide and this intermediate is treated with a halide of a heavy base metal to form the desired insoluble base metal ferrocyanide. In the single solution, toning said metal halide will be combined with the ferricyanide to form directly the heavy base metal ferrocyanide. The solubility of the metal ferricyanides involved will determine the type of toner to be used. The toning baths which contain a halide will also form a silver halide image in conjunction with the insoluble heavy base metal ferrocyanide image.

The combined base metal ferrocyanide and silver halide image can then be developed in a chemical type photographic developer. Since some of the base metal ferrocyanides are soluble in alkaline solutions, it is necessary to use an acid type developer in order that the insoluble base metal ferrocyanide image will be retained along with the new silver image.

This new silver image is then treated in an acid lead ferricyanide solution which will dissolve the silver image and yield one mol of silver ferrocyanide and three mols of lead ferrocyanide.

By firing the ceramic article in a ceramic kiln to a maximum temperature which is sufficiently below the flow point of the glaze to avoid distortion, excellent vitrified colored images are formed. In practice, this temperature, depending upon the glaze composition, will vary from 1200 to 1600° F. The kiln atmosphere should be maintained in an oxidizing condition. Under these conditions, the image which was composed of a base metal ferrocyanide, lead ferrocyanide, and silver ferrocyanide will decompose to form base metal oxide, lead oxide, and silver oxide. As a result of this firing, the metal oxides appear to migrate or diffuse into the glaze on the ceramic object, thus becoming a permanent intimate part of the glaze. This transfer seems to be facilitated by the presence of lead oxide and iron oxide which are formed by the decomposition of the metal ferrocyanides.

The resulting glossy, continuous-tone colored image which is within the internal structure of the glaze is as permanent as the glaze itself. Such permanent images made on ceramic glazes, glass plates, enameled metal plates and the like, may be used to produce reticles, record data, printed circuits and photographic pictures or designs which are of a decorative nature.

The ferricyanide employed as the oxidizing agent is usually water soluble and of an alkali metal such as sodium, potassium, or the like. The salt of the base metal which may also be the metal halide may be of any heavy base metal such as iron, copper, manganese, nickel, cobalt, uranium, vanadium, tin or the like which, on fusion, yields colored heavy metal silicates. The heavy base metal salt should be water soluble and accordingly, there may be used cupric sulfate, manganous sulfate, nickel sulfate, uranium sulfate, cobaltous sulfate, vanadyl sulfate, ferric sulfate, stannous sulfate or the like. In place of these heavy metal sulfates, the corresponding chlorides, bromides, or nitrates have been used. These salts may be used in either the one- or two-solution toning procedure.

The following examples will serve to further illustrate the invention although it is to be understood that the invention is not restricted thereto:

EXAMPLE I

The following solutions are made up separately:

(1) Distilled water _____ cc__ 1200
    Potassium bromide _____ gm__ 72
    Potassium iodide _____ gm__ 1
    Gelatin _____ gm__ 10
(2) Distilled water _____ cc__ 800
    Silver nitrate _____ gm__ 90
    Ammonia (28%) _____ cc__ 100
(3) Ammonium sulfate _____ gm__ 480
(4) Distilled water _____ cc__ 500
    Sodium chloride _____ gm__ 1
    Gelatin _____ gm__ 40

Dissolve each solution separately and make the emulsion under red light illumination. At a temperature of 42° C. and with rapid stirring, add Solution 2 to Solution 1 in one minute. Digest the emulsion for 5 minutes, then add Solution 3 with stirring. Cool the emulsion to 25° C. Wash the precipitate three times by the process of decantation. After the last wash, add Solution 4 with stirring, and raise the emulsion temperature to 48° C. Digest at 48° C. for 60 minutes and then cool. The resulting emulsion will be of a speed similar to normal photographic enlarging paper.

Step 1

The resulting photosensitive emulsion is coated on a porcelain plate by dipping and dried. By means of a photoenlarger, a negative image is projected onto the light-sensitive surface for an exposure time of f16 for 10 to 30 seconds. The resulting latent image is developed for 2 minutes at 18° C. in

SOLUTION A

Distilled water _____ cc__ 1000
Metol (p-methylaminophenol sulfate) _____ gm__ 1
Sodium sulfite _____ gm__ 28
Hydroquinone _____ gm__ 4
Sodium carbonate _____ gm__ 21
Potassium bromide _____ gm__ 1

After development, the plate is rinsed in water for 30 seconds and then fixed for 5 minutes with a 20% sodium thiosulfate solution. After the fixer has removed all of the undeveloped silver halide, the plate is washed in water for 5 minutes and then dried.

Step 2

The resulting silver positive image is then toned for 15 minutes in a mixture of equal parts of the following solutions.

SOLUTION B

Part A:
    Cupric sulfate _____ gm__ 4
    Sodium citrate _____ gm__ 32
    Distilled water _____ cc__ 600

Part B:
    Potassium ferricyanide _____ gm__ 3
    Potassium bromide _____ gm__ 4
    Distilled water _____ cc__ 600

This solution causes the rapid formation of a reddish-brown image that is composed of copper ferrocyanide and silver bromide. After washing for 5 minutes in water, the image is redeveloped for 5 minutes in an acid type developer such as:

Step 3

SOLUTION C

Amidol (2,4-diaminophenol hydrochloride) __gm__ 5
Sodium bisulfite _____ gm__ 5
Sodium sulfate _____ gm__ 10
Distilled water _____ cc__ 1000

The resulting silver image, after washing for 5 minutes in water, is then toned for 20 minutes in the following:

Step 4

SOLUTION D

Distilled water _____ cc__ 1000
Glacial acetic acid _____ cc__ 2
Lead nitrate _____ gm__ 8
Potassium ferricyanide _____ gm__ 4

While in this solution, the black silver image will bleach out to form an image which consists of silver ferrocyanide, lead ferrocyanide, and copper ferrocyanide. After washing the plate for 5 minutes, it is dried.

Step 5

The dried plate is fired in a ceramic kiln with an oxidizing atmosphere to cone 014 to 013. This will normally require 1 to 3 hours, depending on the particular kiln.

After cooling, the plate will contain a vitrified, glossy, positive image that is contained completely within the glaze. The decomposition of the metal ferrocyanides to oxides has provided both the ceramic pigment and a flux to form the glossy red-brown image.

EXAMPLE II

Since the insoluble nature of some metal ferricyanides makes it impossible to form single-solution toners, two-solution toners can be used as indicated in this example. A silver image which has resulted from Example I, Step 1, is bleached for 15 minutes in the following solution:

Distilled water _____ cc__ 1000
Potassium ferricyanide _____ gm__ 8
Ammonia (28%) _____ cc__ 5

While in this solution, the silver image will bleach out to form a white insoluble image of silver ferrocyanide. This image, after washing for 5 minutes in water, is toned in the following solution for 10 minutes:

Distilled water _____ cc__ 1000
Manganese dichloride _____ gm__ 10
Hydrochloric acid (conc.) _____ cc__ 10

This will result in a nearly invisible, slightly blue-white image of manganese ferrocyanide and an image of silver chloride. After washing for 5 minutes, Steps 3, 4, and 5 of Example I are applied.

After firing and cooling, the plate will contain a vitrified glossy image of a brown-black color that is contained completely within the glaze. As in Example I, the decomposition of the metal ferrocyanides to oxides has provided both the ceramic pigment and the flux.

EXAMPLE III

Example I was repeated with the exception that the cupric sulfate used in Solution 3 of Step 2 was replaced by the weight of cobaltous chloride. A brown-black ceramic image was obtained at a temperature corresponding to cone 013 to cone 014. A beautiful purplish-blue was obtained when the material was fired at a higher temperature such as one corresponding to cone 06.

EXAMPLE IV

Example II was repeated with the exception that the 10 grams of manganese dichloride was replaced by the same weight of ferric ammonium oxalate. Firing to a temperature corresponding to cone 013 to cone 014 produced a brown-black image.

Modifications of the invention will occur to persons skilled in the art and I do not, therefore, intend to be limited in the patent granted except as necessitated by the appended claims.

I claim:

1. The process of producing permanent colored photographic images on ceramic ware which comprises applying to such ware a gelatino-silver halide emulsion, exposing said emulsion underneath a pattern and processing the resultant latent image to a silver image, converting said silver image to an image of a mixture containing lead ferrocyanide and a ferrocyanide of a heavy base metal and firing to convert said ferrocyanides to metal oxides.

2. The process of producing a permanent colored photographic image in a ceramic glaze which comprises applying to said glaze a gelatino-silver halide emulsion, exposing said emulsion underneath a pattern and processing the resultant latent image to a silver image, treating said silver image with a water-soluble ferricyanide, a salt of a heavy base metal and of lead, to convert said silver image to an image of a mixture containing lead ferrocyanide and a ferrocyanide of such heavy base metal and firing to convert said ferrocyanides to oxides.

3. The process as defined in claim 2 in which said silver image is treated in the presence of halogen ions and in which said mixture contains lead ferrocyanide, silver ferrocyanide and a ferrocyanide of a heavy base metal.

4. The process of producing a permanent colored photographic image in a ceramic glaze which comprises applying to said glaze a gelatino-silver halide emulsion, exposing said emulsion underneath a pattern and processing the resultant latent image to a silver image, treating said silver image with a water-soluble ferricyanide in the presence of a water-soluble salt of a heavy base metal and halogen ions to produce imagewise a mixture of a silver halide and ferrocyanide of said heavy base metal, developing said silver halide to a silver image, treating the resulting image with a salt of lead and a water-soluble ferricyanide to produce imagewise a mixture of silver ferrocyanide, lead ferrocyanide and a ferrocyanide of said heavy base metal and firing to convert said ferrocyanides to oxides.

5. The process as defined in claim 4 wherein said salt of the heavy base metal is a salt of copper.

6. The process as defined in claim 4 wherein said salt of the heavy base metal is a salt of cobalt.

7. The process of producing a permanent colored photographic image in a ceramic glaze which comprises applying to said glaze a gelatino-silver halide emulsion exposing said emulsion underneath a pattern and processing the resultant latent image to a silver image, treating the silver image with a water-soluble ferricyanide to convert it to a silver ferrocyanide image, reacting the silver ferrocyanide with the water-soluble salt of a heavy base metal to produce imagewise a mixture of silver halide and a ferrocyanide of said heavy base metal, developing the silver halide image reacting the resulting silver image with a salt of lead and a water-soluble ferricyanide to produce a mixture of silver ferrocyanide, lead ferrocyanide and a ferrocyanide of said heavy base metal and firing to convert said ferrocyanides to oxides.

8. The process as defined in claim 7 wherein the salt of the heavy base metal is a manganese halide.

9. The process as defined in claim 7 wherein the salt of the heavy base metal is ferric ammonium oxalate.

No references cited.

NORMAN G. TORCHIN, *Primary Examiner.*

R. MARTIN, *Assistant Examiner.*